(12) United States Patent
Matsuhisa et al.

(10) Patent No.: US 9,506,004 B2
(45) Date of Patent: Nov. 29, 2016

(54) SLIDING MEMBER AND METHOD OF MANUFACTURING SAME

(71) Applicant: DAIDO METAL COMPANY LTD., Nagoya-shi, Aichi-ken (JP)

(72) Inventors: Hiroichi Matsuhisa, Inuyama (JP); Hiroshi Yoshimura, Inuyama (JP); Makoto Shito, Inuyama (JP)

(73) Assignee: DAIDO METAL COMPANY LTD., Aichi (JP)

( * ) Notice: Subject to any disclaimer, the term of this patent is extended or adjusted under 35 U.S.C. 154(b) by 0 days.

(21) Appl. No.: 14/643,127

(22) Filed: Mar. 10, 2015

(65) Prior Publication Data

US 2015/0175922 A1    Jun. 25, 2015

Related U.S. Application Data

(62) Division of application No. 13/638,678, filed as application No. PCT/JP2010/063288 on Aug. 5, 2010, now abandoned.

(30) Foreign Application Priority Data

Mar. 30, 2010    (JP) .................................. 2010-077449

(51) Int. Cl.
    *C10M 107/32*    (2006.01)
    *F16C 33/20*    (2006.01)

(52) U.S. Cl.
    CPC ............ *C10M 107/32* (2013.01); *F16C 33/20* (2013.01); *F16C 33/205* (2013.01); *F16C 2206/40* (2013.01); *F16C 2208/00* (2013.01); *F16C 2240/42* (2013.01); *Y10T 29/49995* (2015.01)

(58) Field of Classification Search
    CPC ............ C10M 107/32; F16C 2240/42; F16C 2206/40; F16C 2208/00; F16C 33/20; F16C 33/205

See application file for complete search history.

(56) References Cited

U.S. PATENT DOCUMENTS

| 4,111,572 A | 9/1978 | Noone et al. |
| 2009/0129853 A1 | 5/2009 | Pionetti |

FOREIGN PATENT DOCUMENTS

| JP | S53-121009 | 10/1978 |
| JP | 08-210357 | 8/1996 |
| JP | 09-210053 | 8/1997 |
| JP | 2000-205266 | 7/2000 |
| JP | 2004-019857 | 1/2004 |
| WO | 2011/121808 A1 | 10/2011 |

OTHER PUBLICATIONS

CN Office Action dated Jun. 18, 2014. Application No. 201080065727.8.
Decision of Refusal issued in the corresponding Korean Application. Application No. 10-2012-7027742 dated May 27, 2014.
English-language translation of the International Preliminary Examination Report issued in PCT/JP2010/063288 on Oct. 23, 2012 (6 pages).
English-language translation of the Written Opinion of the International Search Authority issued in PCT/JP2010/063288 on Oct. 23, 2012 (6 pages).
Japanese Office Action and translation from JP2010-077449 dated Nov. 22, 2013.
Korean Office Action and translation from 10-2012-7027742 dated Oct. 28, 2013.

*Primary Examiner* — Moshe Wilensky
(74) *Attorney, Agent, or Firm* — Browdy and Neimark, PLLC (57) ABSTRACT

A slide member provided with a base, an impregnated layer, and a resin layer. The base made of metal or ceramic. The impregnated layer is defined on a surface portion of a sliding side of the base by forming a recess on the base. The resin layer impregnates the impregnated layer so as to cover a sliding side surface of the base.

6 Claims, 8 Drawing Sheets

SLIDING MEMBER AND METHOD OF MANUFACTURING SAME

TECHNICAL FIELD

The present invention relates to a slide member provided with a resin layer and a method of manufacturing the same.

BACKGROUND

Some slide members are provided with a resin layer that serves as a sliding portion. The resin layer is typically made of PEEK (Polyetheretherketon) that exhibits outstanding sliding properties such as seizure resistance, wear resistance, and mechanical strength.

The resin which forms the resin layer, does not easily establish a chemical bond with metal which is a different type of material. Thus, when the resin layer is applied directly on a metal base serving as a support layer, the resin layer may easily peel from the base. Such being the case, patent document 1 teaches providing a porous sintered layer, obtained by sintering lead bronze powder, on the base and impregnating a portion of the resin layer into the porous sintered layer. Patent Document 1, i.e. JP H08-210357 A teaches that the resin layer is secured on the base through the porous sintered layer by an anchor effect.

SUMMARY OF THE INVENTION

Problems to be Overcome

From a bonding perspective, the possible combinations between different types of base materials such as metal backing and different types of porous sintered layer materials are generally limited. Thus, when it is desired to change the type of metal backing depending upon application, the type of the mating porous sintered layer needs to be changed as well. A change in the type of porous sintered layer will necessitate a change in the sintering conditions such as the sintering temperature.

However, facilities for producing the porous sintered layer are generally designed to meet the sintering conditions. It is thus, for instance, difficult to change the sintering temperature. When it is desired to change the sintering conditions such as the sintering temperature, new facilities need to provided that meet the new sintering conditions.

The present invention is based on the above described background and one object of the present invention is to provide a slide member in which the resin layer can be formed easily on the base and in which the resin layer does not easily peel from the base and a method of manufacturing the same.

Means to Overcome the Problem

The inventors have repeated diligent experiments focusing on the bonding configuration of the base and the resin layer. As a result, the inventors were able to provide the resin layer directly on the base, without the provision of the porous sintered layer, by processing the surface of the base. Thus, it was verified that it is indeed possible to obtain a slide member in which the resin layer can be provided easily on the base and in which the provided resin layer does not easily peel from the base.

Based on the above findings, the inventors have conceived of the following.

In one embodiment, a slide member includes a base made of metal or ceramic, an impregnated layer defined on a surface portion of a sliding side of the base by forming a recess on the base, and a resin layer impregnating and covering the impregnated layer.

Figure 1:
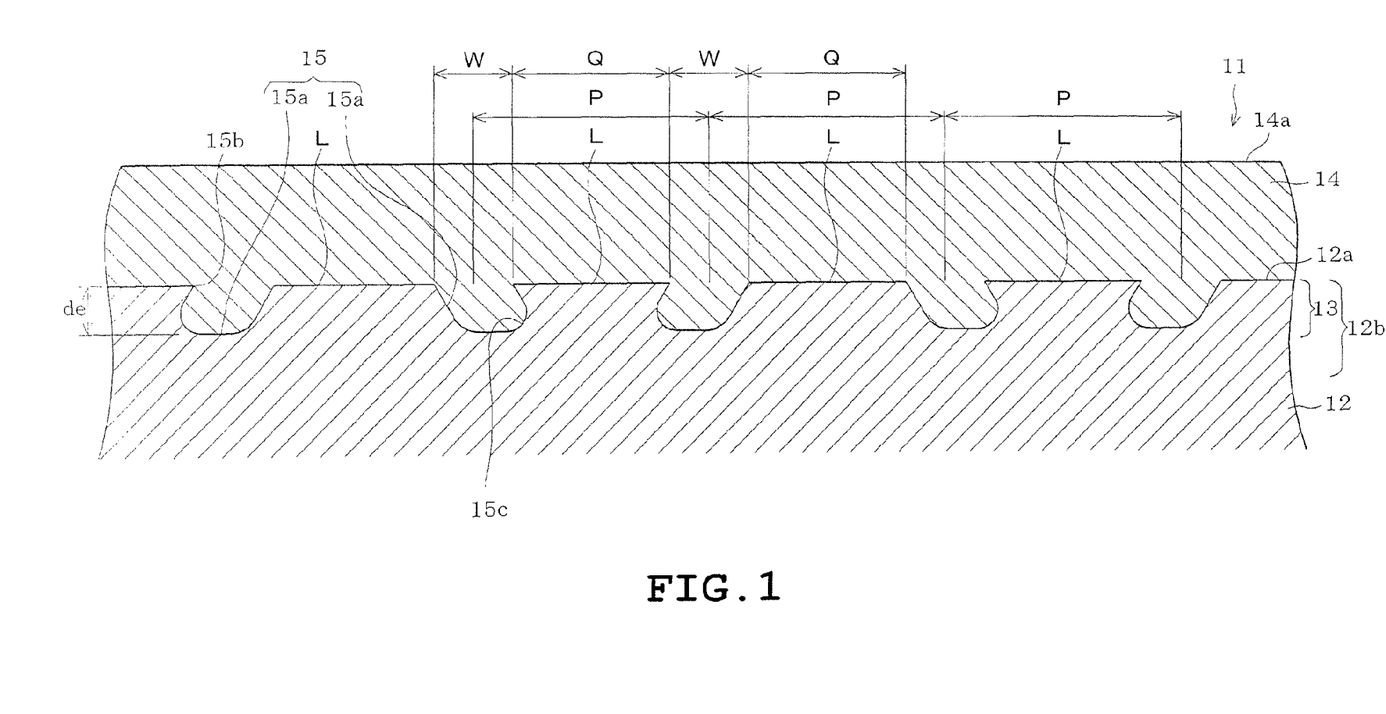
FIG. 1 A schematic cross sectional view of a slide member according to one embodiment.

FIG. 1 is a cross sectional view of one embodiment of the slide member. Slide member 11 shown in FIG. 1 includes base 12, impregnated layer 13, and resin layer 14. The surface of resin layer 14 located on the opposite side of base 12 serves as sliding surface 14a of slide member 11. Further, the surface of base 12 located on resin layer 14 side, that is, the surface of the later described impregnated layer 13 located on resin layer 14 side is illustrated as surface 12a.

Figure 2:
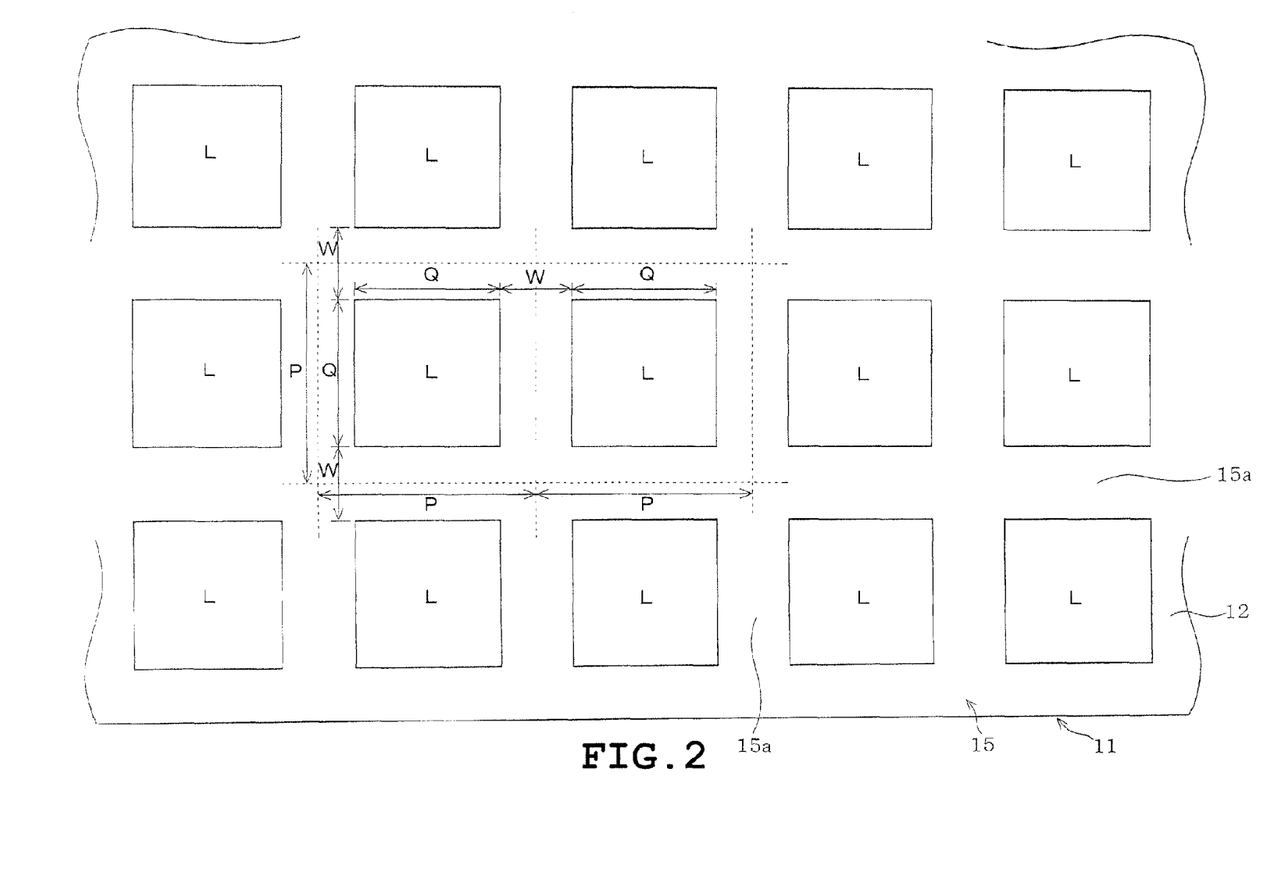
FIG. 2 A transverse plan view taken along the surface of a base.

The transverse cross sectional view taken along surface 12a is shown in FIG. 2. The portions where the planar surfaces of base 12 are present at the height of surface 12a are illustrated as "lands" in the drawings. For instance, in FIGS. 1 and 2, and 6, the lands are identified as "L".

The above described "base" indicates a structure for providing resin layer 14, one example of which is a metal backing. Base 12 is made of metallic material such as iron and copper or ceramic material that belong to a different material category from resin layer 14.

The above mentioned "surface portion of the base" indicates the region residing within a predetermined depth from surface 12a of base 12. The surface portion is identified as 12b in FIG. 1. Further, the "predetermined depth" indicates the depth of the later described recess 15 or a given depth which is equal to or greater than the depth of recess 15.

Impregnated layer 13 is defined by forming recess 15 on surface 12b of base 12. Recess 15 may take various shapes such as a linear groove, curved groove, or a hole. FIG. 2 exemplifies recesses 15 being formed by a plurality of linear grooves 15a being arranged in a matrix. Though not shown, in case recess 15 is formed by a hole, one or more recesses 15 may be formed per slide member, and in case two or more holes are formed, the holes may be interconnected within surface portion 12b.

Regarding recess 15, the area of opening 15b of surface 12a may be configured to be greater or smaller than the surface area of opening 15c within base 12 as shown in FIG. 1. Recess 15 is preferably formed by the later described machining.

Resin layer 14 is provided on impregnated layer 13 by impregnating and covering impregnated layer 13, in other words, by impregnating and covering base 12 with a resin material. In the present embodiment, a portion of resin layer 14 is filled into recess 15 of impregnated layer 13. Thus, resin layer 14 is secured on top of impregnated layer 13 by an anchor effect. Accordingly, resin layer 14 can be provided directly on base 12 without providing the porous sintered layer over the base as was the case in conventional configurations. Resin layer 14 can thus, be readily provided on base 12. Further, because resin layer 14 is secured on impregnated layer 13 by anchor effect, resin layer 14 will not easily peel from base 12.

Further, because slide member 11 is free of porous sintered layer, bonding force between base 12 and resin layer 14 can be controlled. In contrast, a porous sintered layer is obtained by sintering a powder material into a porous state and thus, it is difficult to control the amount of recess formation, in other words, the porosity that affect the bonding force. It is thus, difficult to control the bonding force between the base made of porous sintered layer and the resin layer in the conventional configurations.

The resin forming resin layer 14 preferably comprises polyetheretherketone, polyphenylene sulfide, and polyamide, for instance, that exhibit outstanding sliding properties such as seizure resistance, wear resistance, and mechanical strength of the slide member. These materials may further be configured to include fibers such as potassium titanate whisker and carbon whisker, and solid lubricants such as polytetrafluoroethylene and molybdenum sulfide.

Impregnated layer 13 and resin layer 14 may be provided on both sides of base 12.

In one embodiment, the recess is formed by machining. Recess 15 shown in FIG. 1 is preferably formed by machining such as laser processing and wire cut electrical discharge machining performed by a machining equipment capable of machining recesses. It is easier to control the location and the shape of recess 15 by machining compared to etching.

The slide member according to one embodiment is represented by a relational expression of:

$$Y=a \times x+b (0.45 \le a \le 1.00, -5.00 \le b \le 5.00)$$

where, p represents an opening area of the recess, q represents an area of a sliding side surface of the impregnated layer, x represents an opening area ratio p/q of the recess, and y represents a bonding force between the base and the resin layer.

The above described "opening area p of the recess" indicates the area of opening 15b of recess 15 located on surface 12a of base 12 (impregnated layer 13) shown in FIG. 1, in other words, the total area of the openings configured by grooves 15a, in the example shown in FIG. 2.

The above described "area q of a sliding side surface of the impregnated layer" indicates the area of the sliding side (resin layer 14 side) surface of impregnated layer 13, in other words, surface 12a and thus, opening area p of recess 15 is a portion of area q. Stated differently, "area q of a sliding side surface of the impregnated layer" is the sum of the area of every land and the area of opening area p of every recess 15.

The above described "opening area ratio x of the recess" indicates the ratio that "opening area p of the recess" occupies in "area q of a sliding side surface of the impregnated layer". For instance, "opening area ratio x of the recess" amounts to 60% by the equation: opening area ratio x=(60/100)×100, when, for instance, area q of surface 12a in the sliding side of impregnated layer 13 (area of surface 12a prior to formation of recess 15) is 100 mm² and when recess 15 having an opening area 60 mm² is formed within this area q.

The above described "bonding force y between the base and the resin layer" indicates, in particular, the shearing strength required when base 12 and resin layer 14 are pulled in opposite directions parallel with surface 12a.

The inventors have found, through diligent experiments, the relation between opening area ratio x of recess 15 and bonding force y between base 12 and resin layer 14. The relation between opening area ratio x and bonding force y and regions x and y of slide member 11 specified in the relational expression mentioned earlier is illustrated in FIG. 3.

Figure 3:
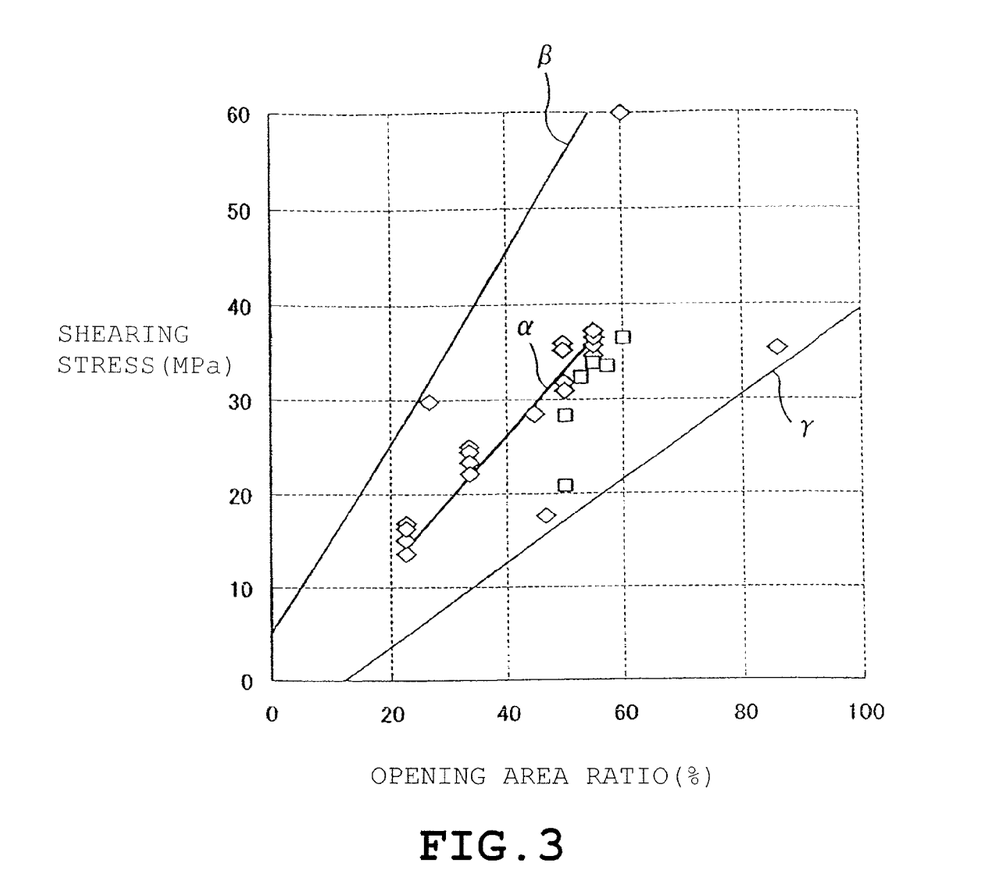
FIG. 3 A chart indicating the relation between the opening area ratio and the shearing stress.

Line α shown in FIG. 3 indicates the relation between opening area ratio x of slide member 11 of the present embodiment and the bonding force, that is, shearing stress y obtained in the shear test. As shown in FIG. 3, bonding force y is proportional to opening area ratio x and can be represented as "y=a×x+b", where 0.45≤a≤1.00 and −5.00≤b≤5.00. Line a was obtained from the test results and is represented as y=0.6×x−1.58. Further, line β is represented as y=x+5 and line γ is represented as y=0.45×x−5. FIG. 3 further exemplifies the shearing stress of EXAMPLE (plotted in diagonals: ◊) which is the same in configuration to slide member 11 of the present embodiment, and the shearing stress of a comparative porous sintered sample representing the conventional configuration (plotted in square: □).

According to the present embodiment, slide member 11 obtains a bonding force (shearing stress) which is equal to or greater than the porous sintered sample when opening area ratio x of slide member 11 is substantially equal to the porous sintered sample. Further, by controlling opening area p of recess 15 such that "y=a×x+b" where 0.45≤a≤1.00 and −5.00≤b≤5.00" is true, slide member 11 having the desired bonding force can be readily obtained.

It is to be noted that a varies depending primarily on the ingredients of resin layer 14. Further, a and b contain variations originating from measurement variations.

As can be understood from above, bonding force y increases with increase in opening area ratio x. In theory, bonding force y is maximized when opening area ratio x is 100%. However, the essence of the present embodiment is the bonding of base 12 and resin layer 14 and thus, the maximum bonding force will have to consider the shearing stress of base 12. That is, the maximum bonding force is obtained by multiplying the shearing stress specific to the base with (100−x0)/100 when the maximum opening area ratio at the time of breakage is represented as x0. The "maximum opening area ratio at the time of breakage" is defined as the maximum opening area ratio measured when slide member 11 breaks when force that breaks (shears) slide member 11 is applied to slide member 11. Further, the maximum theoretical bonding force, that is, the theoretical maximum bonding force in case the shearing stress between base 12 and resin layer 14 is considered, is obtained by (shearing stress specific to base×shearing stress specific to resin)/(shearing stress specific to base+shearing stress specific to resin).

In view of the resin material configuring resin layer 14 and the material configuration as well as the manufacturability of base, x<100, y≤100 is preferable and 10≤x≤90, 5≤y≤50 is even more preferable.

In the slide member according to one embodiment, the recess comprises a plurality of linear grooves being arranged parallel to one another, each of the grooves including an opening having a width amounting to 0.1 to 0.8 times of a pitch of two adjacent grooves.

The "recess" in this context indicates a plurality of linear grooves 15a as shown in FIG. 2. Grooves 15a are arranged so as to be parallel with one another. In case recess 15 comprises a plurality of linear grooves 15a as in this example, a given groove 15a may be arranged to intersect with other plurality of grooves 15a. FIG. 2 exemplifies a given groove 15a intersecting perpendicularly with other grooves.

The above described "width W of the opening of the grooves" indicates width W of the opening of grooves 15a on surface 12a. O represents the width of the lands.

The above described "pitch P between the 2 grooves" indicates, in the 2 linear grooves 15a arranged parallel with one another, the distance between a widthwise center of the opening of one of grooves 15a and a widthwise center of the opening of the other of grooves 15a.

Figure 4:
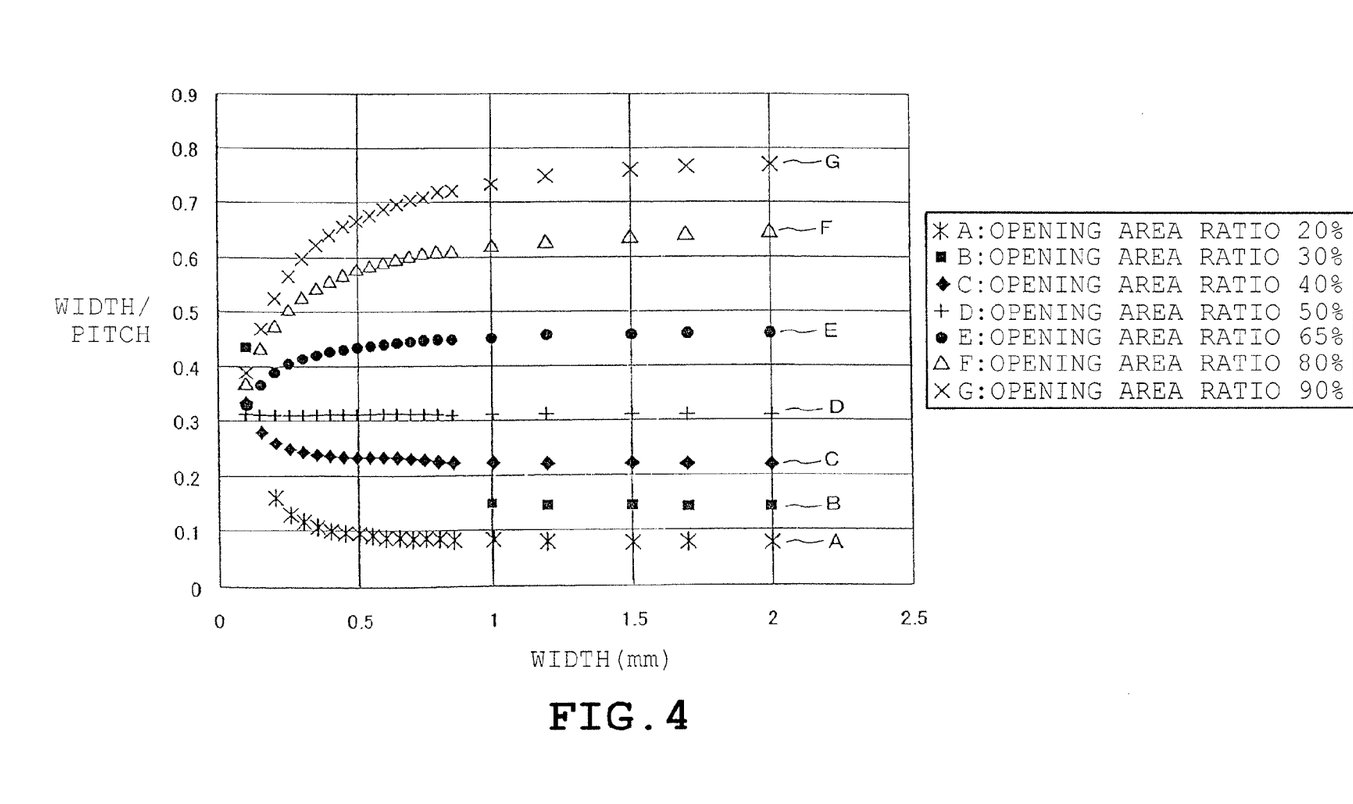
FIG. 4 A chart indicating the relation between the width and the width/pitch.

The relation between "width W of the opening of the groove", "pitch P of the 2 grooves", and "opening area ratio x" is indicated in FIG. 4.

FIG. 4 indicates the relation between width W and width W/pitch P depending upon opening area ratio x in the case when the plurality of the linear grooves intersect, for instance, as shown in FIG. 2. In this example, width W of the opening of groove 15a ranges from 0.1 to 2.0 mm. As shown in FIG. 4, opening area ratio x can be readily configured to 30% or greater by arranging width W of the opening of grooves 15a to 0.1 times or greater than pitch P of 2 adjacent grooves 15a. It can be further understood that opening area ratio x can be readily configured to 90% or less by arranging width W of the opening of grooves 15a to 0.8 times of less than pitch P of 2 adjacent grooves 15a. Thus, anchor effect can be readily obtained in which the resin filled in recess 15 is not easily disengaged.

Width W of the opening of grooves 15a is preferably configured to be 0.15 to 0.75 times of the pitch of 2 adjacent grooves 15a to facilitate the machining and the layout of grooves 15a.

In the slide member according to one embodiment, the recess comprises a plurality of linear grooves in which the maximum depth of the grooves ranges from 200 to 2000 μm, and the grooves are inclined by an angle ranging from 5 to 45 degrees with respect to a thickness direction of the base.

Figure 5:
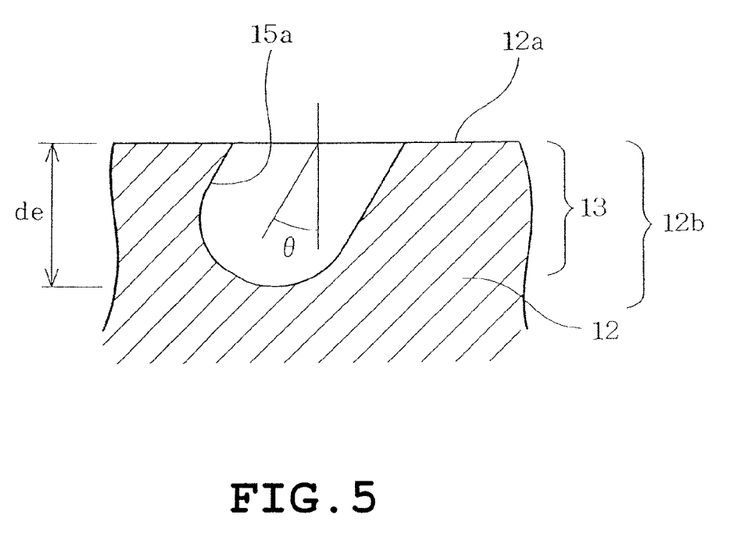
FIG. 5 A view showing a groove extending at an angle.

The above described "depth of groove" indicates the shortest length of the groove extending from surface 12a of base 12 toward the thickness direction of base 12 as shown in FIGS. 1 and 5. The shortest length of the groove is represented by de in FIGS. 1 and 5. FIG. 5 shows base 12 and impregnated layer 13 prior to the provision of resin layer 14. The "deepest depth of the groove" indicates the depth of the groove measured from surface 12a of base 12 to the deepest portion of the groove. The depth of the groove is obtained by observing the vertical cross section of slide member 11 with a profile projector or the like and measuring the observed depth.

By configuring the maximum depth of groove 15a to 200 μm or greater, the anchor effect for securing resin layer 14 to impregnated layer 13 can be improved. Further, when the maximum depth of groove 15a is equal to or less than 2000 μm, the formation of recess 15 through machining becomes easier.

By inclining angle 8 of groove 15a by 5° or more with respect to the thickness direction of base 12, the anchor effect for securing resin layer 14 to impregnated layer 13 can be improved. FIG. 5 shows an example in which θ=20°. Thus, resin layer 14 can be secured tightly to impregnated layer 13. The formation of recess 15 by machining can be facilitated when grooves 15a are inclined by 45° or less with respect to the thickness direction of base 12.

In the slide member according to one embodiment, the maximum surface roughness of the portion of the sliding side surface of the impregnated layer exclusive of the opening of the recess is configured to range from 20 to 100 μm.

The above described "maximum surface roughness" is formed in the portion of the sliding side of surface 12a of impregnated layer 13 exclusive of opening 15b of recess 15, in other words, formed on the lands. The size of "maximum surface roughness" is obtained by measuring the roughness of base 12 with a surface roughness tester prior to the impregnating and covering.

By forming convex-concave portions, in other words, the rough surface portions on the lands, portions of resin layer 14 fills the concaves of the convex-concave portions, and resin layer 14 is secured even more tightly to impregnated layer 13 by anchor effect, allowing resin layer 14 to become even more difficult to peel from base 12. By configuring the maximum surface roughness (Rz) to 20 μm or greater, the above described anchor effect can be sufficiently improved, and configuring the maximum surface roughness (Rz) to 100 μm or less is preferable from the perspective of manufacturability.

In the slide member according to one embodiment, the impregnated layer is divided into low load surface region and a high load surface region receiving heavier load compared to the low load surface region, and $0.2 \leq x1 \leq 0.8$, where p1 represents the opening area of the recess in the high load surface region, q1 represents the area of the sliding side surface of the high load surface region, and x1 represents the opening area ratio p1/q1 of the high load surface region.

In a static load bearing, the impregnated layer may be similarly divided into a main load surface region in which an oil film is formed, and a subload surface region occupying the remaining region of the impregnated layer.

Figure 6:
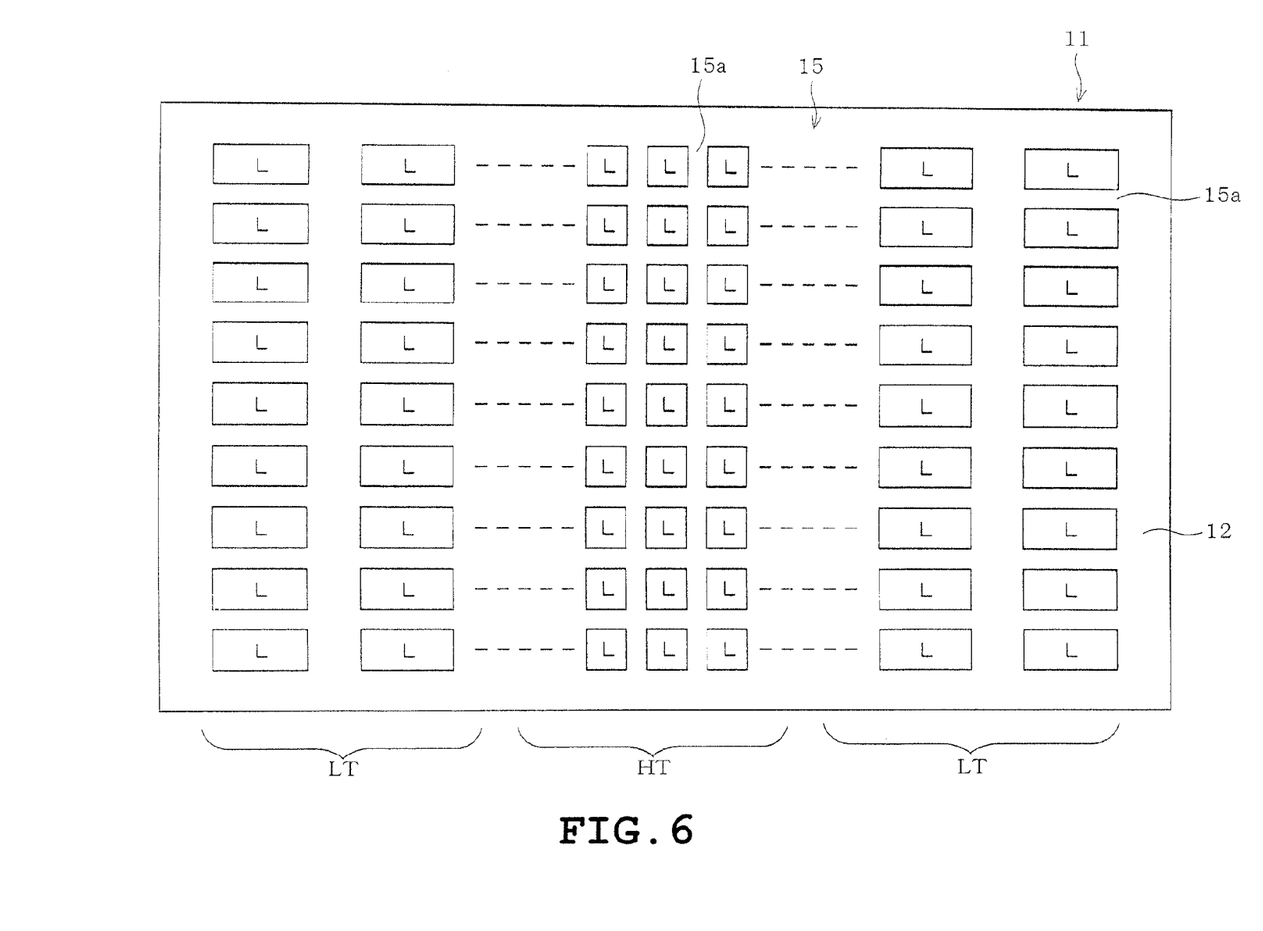
FIG. 6 A view showing the low load surface region and the high load surface region of an impregnated layer.

In slide member 11 of the present embodiment, as shown in FIG. 6, impregnated layer 13 is divided into low load surface region, identified as LT, which receives low load and a high load surface region, identified as HT, which receives heavier load compared to the low load surface region. More specifically, the low load region receives half or less of the maximum load applied by the counter element. In the static load bearing, the main load surface region spans from the oil film starting point to the oil film ending point of the theoretic oil pressure distribution.

In the present embodiment, the bonding force between base 12 and resin layer 14 is enhanced in the high load surface region by controlling opening area ratio x1 in the high load surface region. More specifically, opening area ratio x1 in the high load surface region is controlled to range between $0.2 \leq x1 \leq 0.8$. Opening area ratio x1, when represented in percentage, range between $20\% \leq x1 \leq 80\%$.

When opening area ratio x1 in the high load surface region is equal to or greater than 0.2, in other words, 20%, the bonding force between base 12 and resin layer 14 in the high load surface region is high, and thus, resin layer 14 does not easily peel from base 12 even when subjected to high load. Further, opening area ratio x1 in the high load surface region being equal to or less than 0.8, in other words, 80%, is advantageous in terms of manufacturability. In the low load surface region, on the other hand, large opening area ratio need not be established since it is not subjected to high load on a regular basis. Thus, the amount of machining in the low load surface region of impregnated layer 13 of slide member 11 can be reduced. In case materials with relatively high heat conductivity such as steel is used for base 12, the ratio of base 12 that occupies impregnated layer 13 is relatively increased as the opening area ratio becomes smaller which is advantageous in terms of heat dissipation.

Slide member 11 may be used in a tilting pad thrust bearing. In an application where load resistance is most required, a typical condition of which may be relatively high specific load of approximately 3 MPa and a relatively low revolution speed condition of approximately 15 m/sec or less, opening area ratio x1 of the high load surface region is preferably configured to range between $0.4 \leq x1 \leq 0.8$. From the perspective of strength and manufacturability, the range of $0.5 \leq x1 \leq 0.6$ is even more preferable. In such case, the opening area ratio of the low load surface region is preferably equal to or less than 0.4, in other words, equal to or less than 40%. In an application where seizure resistance is most required, a typical condition of which may be relatively low specific load of 2 MPa or less and a relatively high revolution speed greater than 15 m/sec, opening area ratio x1 of the high load surface region is preferably configured to range between $0.2 \leq x1 \leq 0.4$. In such case, the opening area ratio of the low load surface region is preferably equal to or less than 0.4, in other words, equal to or less than 40%. From the perspective of manufacturability, the opening area ratio of the low load surface region is preferably equal to or less than x1.

A method of manufacturing a slide member according to one embodiment is directed to a slide member provided with a base made of metal or ceramic, an impregnated layer defined on a surface portion of a sliding side of the base by forming a recess on the base, and a resin layer impregnating and covering the impregnated layer. The maximum surface roughness of a portion of a sliding side surface of the impregnated layer exclusive of an opening of the recess ranges from 20 to 100 μm. The method includes forming the recess on the surface portion of the sliding side of the base by machining carried out by a machining equipment to obtain the impregnated layer, and forming a convex-concave portion having a maximum surface roughness ranging from 20 to 100 μm on a portion of the sliding surface of the impregnated layer exclusive of the opening of the recess by machining by the machining equipment.

The above described "machining equipment" indicates a machining equipment capable of performing the earlier mentioned laser processing, wire cut electrical discharge machining, and other processes that allows formation of a recess.

In the present embodiment, a machining equipment is used to form recesses 15 on surface portion 12b of the sliding side of base 12. The machining equipment is also used to form convex-concave portions on a portion of surface 12a located in the sliding side of impregnated layer 13 exclusive of the openings of recesses 15, in other words, on the lands. The maximum surface roughness (Rz) of the convex-concave portions ranges from 20 to 100 μm. Thus, an additional machining equipment for formation of the convex-concave portions on the lands need not be provided, and the formation of recesses 15 on surface 12b of the sliding side of base 12 and formation of the convex-concave portions on the lands, in other words, on surface 12a, can be carried out consecutively. This reduces the time for manufacturing slide member 11.

The convex-concave portions need not be formed on the lands if not required.

BRIEF DESCRIPTION OF THE DRAWINGS

FIGS. 7A and 7B Figures depicting the shape of a sample piece used in the shear test.

EMBODIMENTS OF THE INVENTION

Next, an embodiment will be described with reference to FIGS. 1 to 3 and 7 and 8.

Slide member 11 of the present embodiment is obtained by preparing a base metal backing 12 made, for instance, of steel, providing impregnated layer 13 by forming recess 15 on surface portion 12b of base metal backing 12, and impregnating and covering impregnated layer 13 with resin layer 14 primarily composed of PEEK.

In order to verify the bonding force, in other words, the shearing stress of base 12 and resin layer 14 of slide member 11 of the present embodiment, EXAMPLES based on the embodiment and COMPARATIVE EXAMPLES based on conventional porous sintered configuration were prepared and were screened through a shear test.

More specifically, EXAMPLES were prepared as follows.

First, a steel backing plate serving as the base and having a thickness of 20 mm was prepared. Then, recesses were formed, by wire cut electrical discharge machining, on the surface portion of the base such that each of the recesses is 1 mm deep, inclined by angle θ configured at 15°, and has a predetermined opening area ratio x. A base plate provided with an impregnated layer was thus, obtained.

In the present embodiment, PEEK was used as the resin material for the resin layer.

The plate was heated to or above the melting point of PEEK and a sheet of PEEK, being thinned to 5 mm by a sheet extruder, was superimposed and pressed on the plate. EXAMPLE comprising a base plate having an impregnated layer impregnated and covered by the sheet was thus obtained which is similar in structure to slide member 11.

Additional EXAMPLES were prepared in a similar manner with the exception of the difference in opening area ratio x.

COMPARATIVE EXAMPLES based on a conventional porous sintered slide member made having a porous sintered layer was obtained as described in detail below.

First, bronze powder was applied on the surface of the base comprising a steel back plate being 20 mm thick until the applied bronze powder amounted to a thickness of 1 mm. Then, the bronze-applied base was heated to 800° C. and sintered. A composite member having a porous sintered layer provided over the base was thus, obtained.

Then, as described above, the PEEK sheet was superimposed and pressed on the composite member. COMPARATIVE EXAMPLE comprising a porous sintered sample was thus, obtained by impregnating and covering the porous sintered layer of the composite member with the sheet.

Figure 7A:
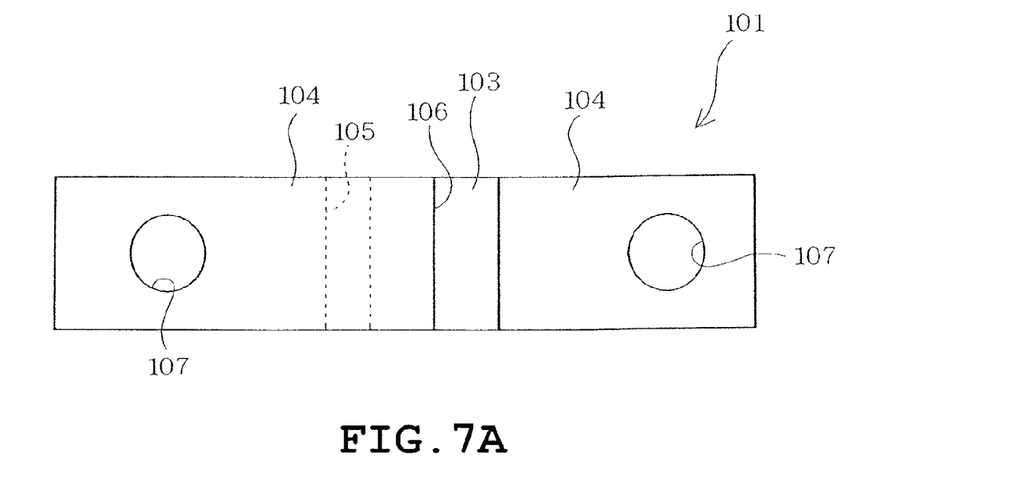
FIG. 7A is a plan view of the test piece and FIG. 7B is a front view of the test piece.
Figure 7B:
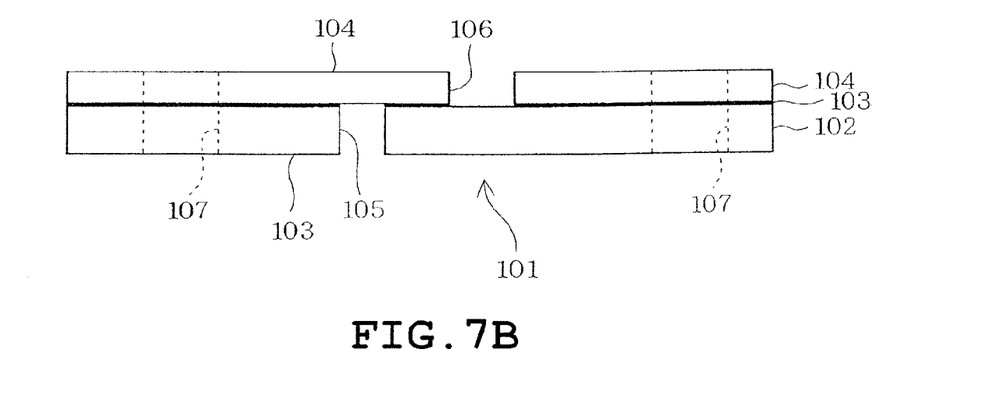

Test piece 101 shown in FIG. 7 was prepared based on each of EXAMPLES and COMPARATIVE EXAMPLES for evaluation of bonding force, in other words, for shear testing of EXAMPLES and COMPARATIVE EXAMPLES. Test piece 101 is formed by providing impregnated layer 103 over base 102 and forming resin layer 104 over impregnated layer 103. In COMPARATIVE EXAMPLE, porous sintered layer 103 corresponds to the impregnated layer. On one given location of base 102 of test piece 101, notch 105 is formed by cutting. Similarly, on one given location of impregnated layer 103 of test piece 101, notch 106 is formed by cutting work. Notch 105 and notch 106 are spaced by a predetermined distance in top view. With the exception of notch 105 and notch 106, the surface of base 102 is bonded with resin layer 104 over impregnated layer 103 in the above described structure.

On each of the left and right ends of test piece 101, a circular opening 107 is formed. In the shear test, the 2 openings 107 are attached to the tensile tester and test piece 101 is pulled in both the left and right directions to obtain a measurement of bonding force between base 102 and resin layer 104, in other words, the measurement of shearing stress. The test results are shown in FIG. 3.

The following provides an analysis of the test results. For instance, when opening area ratio x of the EXAMPLES is 50% in FIG. 3, the shear test of the EXAMPLES (plotted in diagonal FIG. 3: ◇) is substantially equal to or greater than the shearing stress of COMPARATIVE EXAMPLES (plotted in square in FIG. 3: □).

Further, in order to verify the seizure resistance of the above described EXAMPLES, a new set of test pieces of EXAMPLES 1 to 13 was prepared based on the EXAMPLES to conduct the seizure test. A new set of COMPARATIVE EXAMPLES 1 to 3 was prepared based on COMPARATIVE EXAMPLES to conduct the seizure test. Table 1 lists the samples used in the seizure test. As shown, EXAMPLES 1 to 13 and COMPARATIVE EXAMPLES 1 to 3 differ in opening area ratio, in other words, the porosity.

TABLE 1

| SAMPLE No. | GROOVE WIDTH (mm) | PITCH (mm) | OPENING AREA RATIO (%) | AVERAGE SEIZURING SPECIFIC LOAD |
|---|---|---|---|---|
| EXAMPLES 1 to 3 | 0.40 | 3.20 | 23 | 19 |
| EXAMPLES 4 to 6 | 0.42 | 2.22 | 34 | 17 |
| EXAMPLES 7 to 9 | 0.38 | 1.47 | 45 | 14 |
| EXAMPLES 10 to 12 | 0.45 | 1.22 | 60 | 10 |
| EXAMPLES 13 | 0.45 | 0.99 | 70 | 9 |
| COMPARATIVE EXAMPLES 1 TO 3 | POROUS SINTERED LAYER (60%) | | | 8 |

Figure 8:
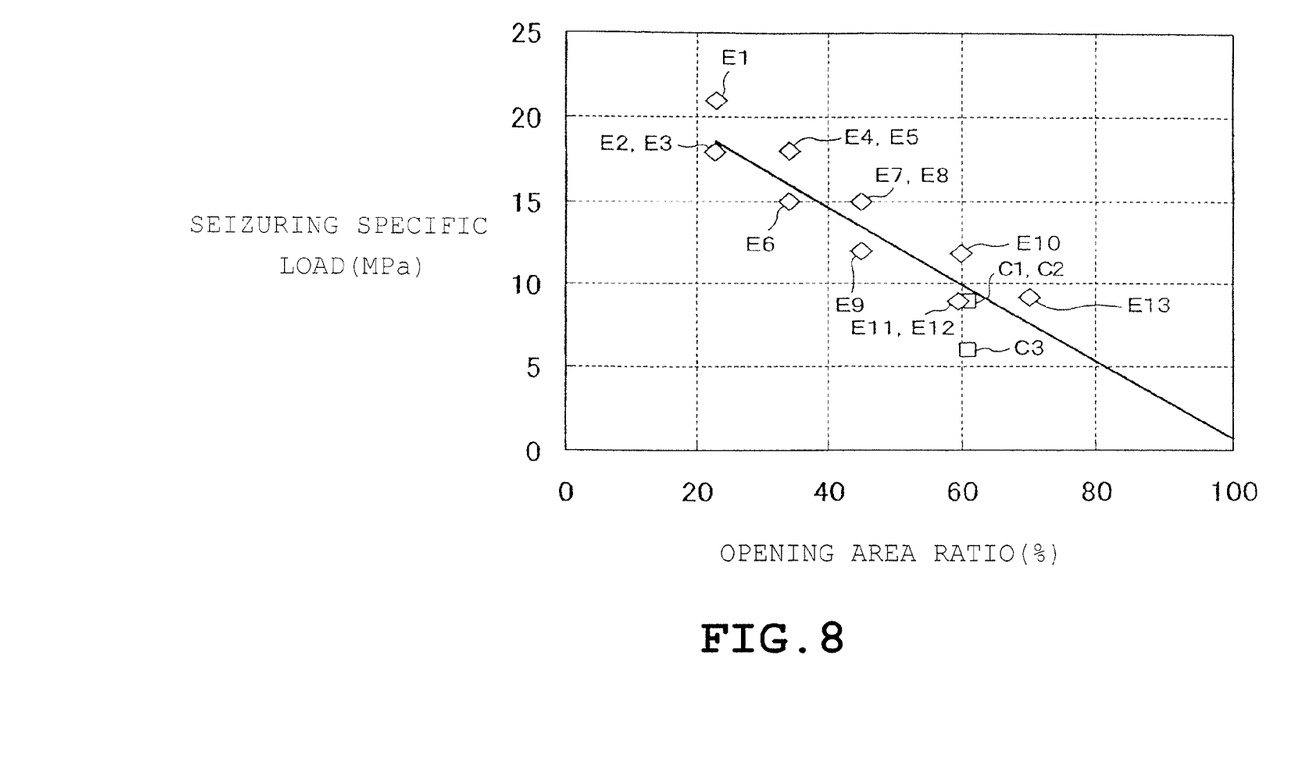
FIG. 8 A chart illustrating the test results of the seizure test.

The test conditions of the seizure test are indicated in Table 2 and the test results of the seizure test are shown in FIG. 8 and Table 1. FIG. 8 shows the relation between opening area ratio x and the seizuring specific load and indicates the test results for EMBODIMENTS 1 to 13 (E1 to E13) and COMPARATIVE EMBODIMENTS 1 to 3 (C1 to C3).

In Table 1, "AVERAGE SEIZURING SPECIFIC LOAD" indicates the average specific load in which seizuring was observed for EXAMPLES 1 to 3, the average specific load in which seizuring was observed for EXAMPLES 4 to 6, and the average specific load in which seizuring was observed for EXAMPLES 7 to 9, the average specific load in which seizuring was observed for EXAMPLES 10 to 12, the average specific load in which seizuring was observed for EXAMPLE 13, and the average specific load in which seizuring was observed for COMPARATIVE EXAMPLES 1 to 3.

TABLE 2

| ITEM | PARAMETERS | UNIT |
|---|---|---|
| BEARING SIZE | φ27 × φ22, GROOVE WIDTH 3 | mm |
| REVOLUTION SPEED | 2 | m/s |
| LUBRICANT | VG32 | — |
| LUBRICANT TEMPERATURE | 40 | °C. |
| LUBRICANT AMOUNT | 20 | ml/min |
| SHAFT MATERIAL | S35C | — |
| SHAFT ROUGHNESS | 1 μm or less | Rz |
| METHOD OF EVALUATION | LOAD INCREASED BY 3 MPa AT 30 MINUTE INTERVAL SEIZURE CONSIDERED TO HAVE OCCURRED WHEN TEMPERATURE OF SLIDING SURFACE OR DRIVE TORQUE BECOMES EQUAL TO OR GREATER THAN PRE-DETERMINED VALUE LAST SPECIFIC LOAD MEASURED JUST BEFORE OCCURENCE OF SEIZURE IS CONSISERED AS SEIZURING SPECIFIC LOAD | — |

An analysis is given on the results of the seizure test.

In EXAMPLES 1 to 13, recesses, in other words, grooves are formed optimally as compared to COMPARATIVE EXAMPLES 1 to 3 and thereby exhibit good heat conductivity. Thus, heat produced at the sliding surface is emitted more effectively to base in EXAMPLES 1 to 13 as compared to COMPARATIVE EXAMPLES 1 to 3. Hence, it can be understood that EXAMPLES 1 to 13 have outstanding seizure resistance.

Further, it can understood from comparison between EXAMPLES 1 to 13 that when steel metal backing is used as the base and PEEK is used as the resin layer, seizure resistance becomes greater as opening area ratio is reduced. It is presumed that increasing the percentage of the base in the impregnated layer improves the heat dissipation to thereby improve the seizure resistance.

DESCRIPTION OF REFERENCE SYMBOLS

In the drawings, 11 indicates a slide member; 12, a base; 12a, a surface; 12b, a surface portion; 13, an impregnated layer; 14, a resin layer; 15, a recess; and 15a, a groove.

What is claimed is:

1. A slide member comprising:
a base made of metal or ceramic;
an impregnated layer defined on a surface portion of a sliding side of the base by forming a recess on the base; and
a resin layer impregnating the impregnated layer and covering a sliding side surface of the base,
wherein $Y = a \times x + b$ ($0.45 \leq a \leq 1.00$, $-5.00 \leq b \leq 5.00$) where, p represents an opening area of the recess, q represents an area of a sliding side surface of the impregnated layer, x represents an opening area ratio p/q of the recess, y represents a bonding force between the base and the resin layer.

2. The slide member according to claim 1, wherein the recess is formed by machining.

3. The slide member according to claim 1, wherein the recess comprises a plurality of linear grooves being arranged parallel to one another, each of the grooves including an opening having a width amounting to 0.1 to 0.8 times of a pitch of two adjacent grooves.

4. The slide member according to claim 1, wherein the recess comprises a plurality of linear grooves in which the maximum depth of the grooves ranges from 200 to 2000 μm and the grooves are inclined by an angle ranging from 5 to 45 degrees with respect to a thickness direction of the base.

5. The slide member according to claim 1, wherein a maximum surface roughness of a portion of a sliding side surface of the impregnated layer exclusive of the opening of the recess is configured to range from 20 to 100 µm.

6. The slide member according to claim 1, wherein the impregnated layer is divided into a low load surface region and a high load surface region receiving higher load compared to the low load surface region, and $0.2 \leq x1 \leq 0.8$, where p1 represents an opening area of the recess in the high load surface region, q1 represents an area of a sliding side surface of the high load surface region, and x1 represents an opening area ratio p1/q1 of the high load surface region.

* * * * *